United States Patent [19]

Rabe et al.

[11] 4,418,781

[45] Dec. 6, 1983

[54] STEERING APPARATUS

[75] Inventors: William T. Rabe; Maurice P. Roberts, both of Lafayette, Ind.

[73] Assignee: TRW Inc., Cleveland, Ohio

[21] Appl. No.: 386,907

[22] Filed: Jun. 10, 1982

[51] Int. Cl.³ .............................................. B62D 5/10
[52] U.S. Cl. ................................ 180/155; 74/388 PS; 91/375 A; 92/136; 280/96
[58] Field of Search ............... 180/146, 147, 148, 154, 180/155, 156, 157, 158, 159, 160, 161, 162, 163; 91/375 A, 375 R, 401, 422, 431; 74/388 PS; 277/212 FB; 92/136; 280/95 R, 95 A, 96

[56] References Cited

U.S. PATENT DOCUMENTS

| | | | |
|---|---|---|---|
| Re. 24,006 | 5/1955 | Acton | 172/316 |
| 2,448,851 | 9/1948 | Wharam et al. | 403/64 |
| 3,022,772 | 2/1962 | Zeigler et al. | 91/375 A |
| 3,596,916 | 8/1971 | Gottschald | 277/212 |
| 3,680,443 | 8/1972 | Jenvey | 280/96 X |
| 3,698,188 | 10/1972 | Jenvey | 180/163 X |
| 3,824,905 | 7/1974 | Jablonsky | 92/136 |
| 3,918,544 | 11/1975 | Jablonsky et al. | 180/146 |
| 4,063,490 | 12/1977 | Duffy | 91/375 AX |
| 4,150,835 | 4/1979 | Wheelock | 277/165 |

FOREIGN PATENT DOCUMENTS

979377 1/1965 United Kingdom ............... 180/148

Primary Examiner—Joseph F. Peters, Jr.
Assistant Examiner—Mitchell J. Hill
Attorney, Agent, or Firm—Yount & Tarolli

[57] ABSTRACT

An improved steering apparatus includes a piston and cylinder type motor having a hollow piston rod extending out of one end of a motor cylinder. Since the piston rod extends out of only one end of the motor cylinder, the working area on the head end of the piston is greater than the working area in the rod end of the piston. The head end working area is exposed to fluid pressure during turns in one direction and the rod end working area is exposed to fluid pressure during turns in the opposite direction. A compensator chamber is provided in the hollow piston rod. The compensator chamber has a working area on the rod end of the piston. The compensator chamber working area is exposed to fluid pressure during turns in both directions. The size of the compensator chamber working area is equal to the cross sectional area of a tubular wall of the piston rod. Since the compensator chamber working area is the same size as the cross sectional area of the piston rod and is on the rod end of the piston, exposing the compensator chamber working area to fluid pressure during turns in both directions tends to equalize the steering forces in both directions.

24 Claims, 7 Drawing Figures

STEERING APPARATUS

BACKGROUND OF THE INVENTION

The present invention relates to a new and improved steering apparatus.

A known power steering apparatus is disclosed in U.S. Pat. No. 3,918,544. The apparatus includes a piston and cylinder type motor. A hollow piston rod is connected with one end of the piston and extends through an end wall of the motor cylinder. The head end working area of the piston exceeds the rod end working area of the piston by an amount which is equal to the cross sectional area of the piston rod.

Upon actuation of a power steering control valve in this known apparatus, fluid pressure is ported to either the rod or head end portion of the motor cylinder to effect movement of the piston. As this occurs, a screw member connected with the piston is rotated to provide feedback indicative of the extent of movement of the piston. A seal at one end of the screw member engages the inside of the hollow piston rod to form a chamber between the seal and the axially outer end portion of the piston rod. This chamber is connected with a reduced or drain pressure.

In a steering apparatus such as the one shown in U.S. Pat. No. 3,918,544, the working area of the head end of the piston exceeds the working area of the rod end of the piston by an amount which is equal to the cross sectional area of the tubular wall of the piston rod. The difference in the working areas on the head and rod ends of the piston tends to result in the application of different steering forces to the vehicle wheels during turns in opposite directions, even though the extent and rate of rotation of the vehicle's steering wheel in each direction is the same.

BRIEF SUMMARY OF THE PRESENT INVENTION

The present invention provides a new and improved steering apparatus which effectively equalizes the rod and head end working areas of the piston in a power steering motor even though a piston rod extends from only one side of the piston. The head and rod end working areas of the piston are the surface areas on the head and rod ends of the piston projected onto a plane extending perpendicular to a path along which the piston is movable under the influence of fluid pressure. When the fluid pressure to which the head or rod end of a piston is exposed is multiplied by the head or rod end working area of the piston, the result is equal to the force applied to the piston by the fluid pressure.

When a piston rod extends from one side of a piston, the working area of that side is reduced by the cross sectional area of the rod. In order to compensate for the cross sectional area of the hollow piston rod that extends from one side of the piston of the present invention, a compensator chamber is formed inside the piston rod. The compensator chamber has a working area on the rod end of the piston which is equal to the cross sectional area of the piston rod. A compensator valve assembly directs fluid pressure to the chamber whenever a steering control valve is actuated.

When the steering control valve is actuated to direct fluid pressure against the head end of the piston, the pressure is also applied against the compensator chamber working area on the rod end of the piston to offset a portion of the fluid pressure applied against the working area on the head end of the piston. As a result, the effective working area on the head end of the piston is equal to the working area on the rod end of the piston. Equal fluid pressure forces are thus applied to the piston during turns in opposite directions when the steering apparatus is subjected to the same operating conditions.

Accordingly, it is an object of this invention to provide a new and improved apparatus for turning steerable vehicle wheels in which rod and head end working areas of a piston in a power steering motor are effectively equalized even though a piston rod extends from only one side of the piston.

Another object of this invention is to provide a new and improved apparatus as set forth in the foregoing object in which a compensator chamber is pressurized during turning movement of the steerable vehicle wheels in either direction and the compensator chamber has a working area on a rod end of the piston equal to the cross sectional area of the piston rod.

Another object of this invention is to provide a new and improved apparatus for use in turning steerable vehicle wheels which includes a steering control valve for porting fluid pressure to opposite ends of a motor cylinder chamber to effect turning movement of steerable vehicle wheels in opposite directions and a compensator valve for porting fluid pressure from the motor cylinder chamber to a compensator chamber to thereby promote equalization of steering forces during turns in opposite directions under the same vehicle operating conditions.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

General Description

Figure 1:
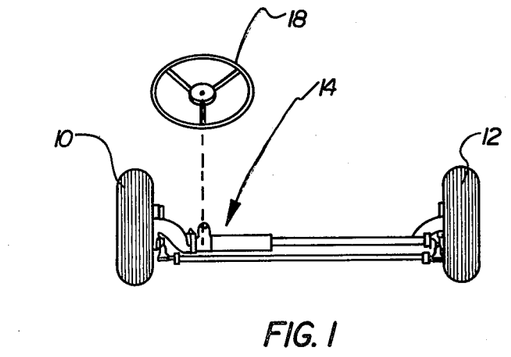
FIG. 1 is a schematic illustration depicting the relationship between a pair of steerable vehicle wheels and a steering apparatus for turning the wheels.

Steerable vehicle wheels 10 and 12 (see FIG. 1) are turned by a steering apparatus 14 constructed in accordance with the present invention. The steering apparatus 14 is connected with the wheels 10 and 12 in a known manner. Upon rotation of a steering wheel 18, the steering apparatus 14 turns the steerable vehicle wheels 10 and 12.

The steering apparatus 14 (see FIG. 2) includes a power steering motor 22 having a wall assembly 24 which defines a cylindrical main chamber 26 in which a piston 28 is located. The cylindrical piston 28 divides the main chamber into a head end variable volume chamber 32 and a rod end variable volume chamber 34. A hollow cylindrical piston rod 38 is fixedly connected to the piston 28 and extends through the variable volume chamber 34 and a circular opening in an end section 40 of the wall assembly 24. The outer end 42 of the piston rod 38 is connected with a link 44 of the steering linkage by a ball and socket joint assembly 46. The opposite end of the motor wall assembly 24 is connected with a frame mounted bracket 48 by a second ball and socket joint assembly 50.

Figure 2:
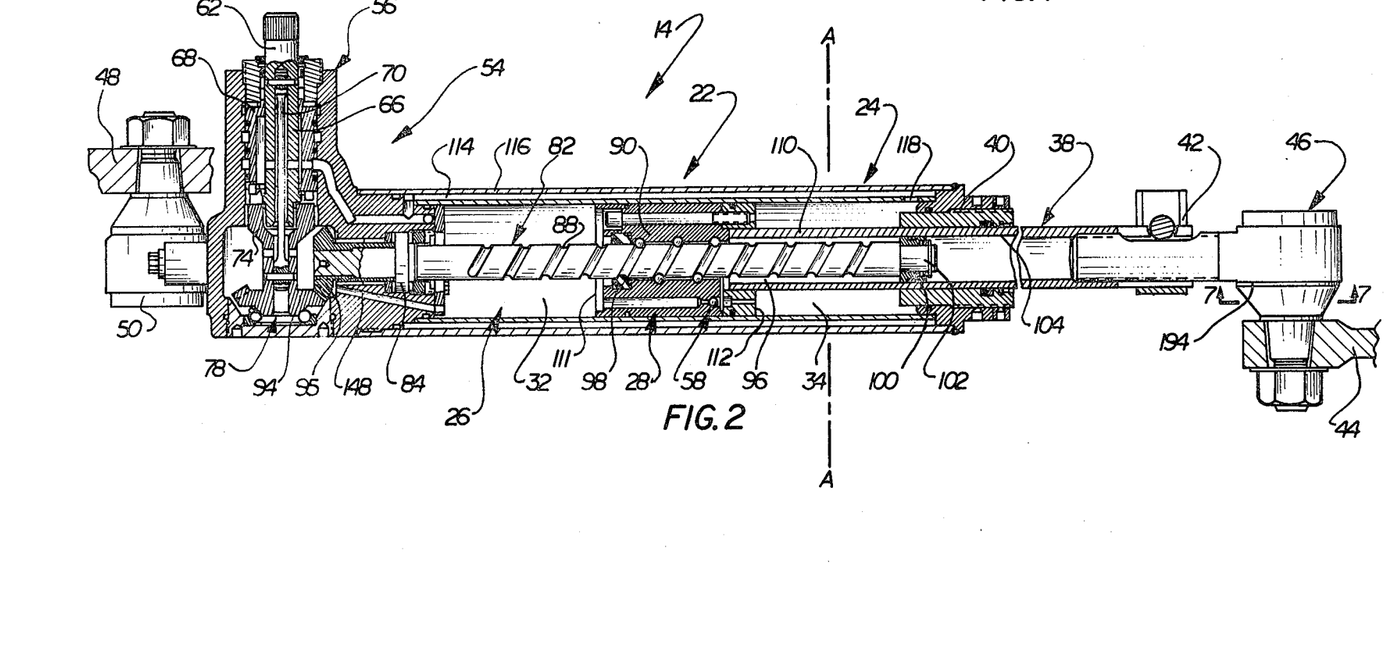
FIG. 2 is an enlarged sectional view further illustrating the construction of the steering apparatus of FIG. 1.

A control valve assembly 54 is provided to control the operation of the motor 22. The control valve assembly 54 includes a steering control valve 56 and a compensator or secondary control valve 58. The steering control valve 56 directs high pressure fluid from a power steering pump (not shown) to the power steering motor 22 to effect turning movement of the steerable vehicle wheels toward the left or the right.

The steering control valve 56 includes a rotatable input member 62 which is connected with the steering wheel 18 (FIG. 1) for rotation therewith. An inner valve member or spool 66 (see FIG. 2) is fixedly connected with the input member 62 and is rotatable relative to an outer valve member or sleeve 68. The valve sleeve 68 is connected with the valve spool 66 through a torsion bar 70 and a base member 74 which is secured to one end of the torsion bar.

Upon rotation of the steering wheel 18, the input member 62 flexes the torsion bar 70 and rotates the inner valve spool 62 through a short arcuate distance relative to the valve sleeve 68. The relative rotation between the inner valve member 66 and the valve sleeve 68 ports high pressure fluid to one of the variable volume chambers 32 or 34 and connects the other variable volume chamber with a reservoir or drain (not shown). This effects operation of the power steering motor 22 to turn the steerable vehicle wheels.

As the power steering motor 22 is operated, a feedback system 78 rotates the base member 74 and the valve sleeve 68 toward their initial positions relative to the inner valve member 66. Once the power steering motor 22 has been operated to an extent corresponding to the extent of rotation of the steering wheel 18, the inner and outer valve members 66 and 68 are returned to their initial positions to interrupt operation of the steering motor. The manner in which the steering control valve 56 is constructed may be the same as is shown in U.S. Pat. application Ser. No. 441,503, filed Nov. 15, 1982, by William T. Rabe and Jim L. Rau and entitled "Power Steering Control Apparatus" (PF 492, Ross File 174, attorney docket TRW(RG)-7941). However, if desired, the steering control valve 56 could be constructed in a manner similar to that disclosed in U.S. Pat. No. 3,709,099.

The feedback system 78 (FIG. 2) restores the inner and outer valve members 66 and 68 to their initial positions when the power steering motor 22 is operated to an extent corresponding to the extent of rotation of the input member 62. In addition, the feedback system 78 provides a direct mechanical drive if a power steering pump (not shown) is ineffective to provide high pressure fluid to the motor 22. The feedback system 78 includes a rotatable screw member 82 which is coaxial with the wall assembly 24, piston 28 and piston rod 38. The screw member 82 extends through the piston 28 into a telescopic relationship with the hollow piston rod 38. The screw member 82 is supported for rotation and held against axial movement by a bearing assembly 84 mounted on the wall assembly 24.

The screw member 82 is provided with an external thread convolution 88 which is engaged by a recirculating ball nut 90 in the piston 28. Due to the interaction between the recirculating ball nut 90 and the external thread convolution 88, axial movement of the piston 28 causes the screw member 82 to be rotated to an extent which varies as a function of the extent of movement of the piston relative to the wall assembly 24. Bevel gears 94 and 95 in the feedback linkage 78 transmit the rotary motion of the screw member 82 to the outer valve member 68. This results in the outer valve member 68 being rotated relative to the inner valve member 66 to an extent which corresponds to the extent of axial movement of the piston 28. The screw member 82, gears 94 and 95, and steering control valve 54 cooperate in the same general manner as is disclosed in U.S. Pat. No. 3,918,544.

An annular compensator or secondary chamber 96 extends axially along the screw member 82. One end of the compensator chamber 96 is provided by a seal 98 between the ball nut 90 and the screw member 82. The seal 98 extends into the root of the external thread convolution 88 to block fluid leakage from the head end variable volume chamber 32 along the screw member 82 into the compensator chamber 96. The other end of the compensator chamber 96 is provided by an annular sealing wall 100 between outer end portion 102 of the screw member 82. The axial walls of the chamber are provided by a cylindrical inner surface 104 of the hollow piston rod 38, the inner surface of the ball nut 90 and the outer surface of the screw member 82.

The compensator chamber 96 is sized so that it has working area on the rod end of the piston 28 equal to the cross sectional area of the tubular wall 110 of the piston rod 38. Thus, the compensator chamber 96 has an annular working area projected on a plane indicated at A-A in FIG. 2. The working area of the compensator chamber 96 is equal to the annular cross sectional area of the tubular piston rod wall 110 in the plane A-A. The plane A-A extends perpendicular to the central axis of the piston rod 38 and the path of movement of the piston 28 in the chamber 26.

The head end working area of the piston 28 is equal to the surface area of the head end 111 of the piston 28 projected onto the plane A-A. The rod end working area of the piston 28 is equal to the surface area of the rod end 112 of the piston outside of the piston rod 38 projected onto the plane A-A. When the fluid pressure to which the head or rod end 111 or 112 of the piston 28 is exposed is multiplied by the head or rod end surface area, the result is equal to the force applied to the piston 28 by the fluid pressure. In the present instance, the head end 111 of the piston 28 has a working area which exceeds the working area of the rod end 112 of the piston by an amount equal to twice the annular cross sectional area of the tubular wall 110 of the piston rod 38.

When fluid pressure is applied against the head end 111 of the piston, that is when the steering control valve 56 is actuated to port fluid pressure to the variable volume chamber 32, the compensator valve 58 directs fluid pressure from the variable volume chamber 32 to the compensator or secondary chamber 96. The fluid pressure force applied to the rod end 112 of the piston 28 by the fluid in the compensator chamber 96 opposes the fluid pressure force applied against the head end of the piston 28. Since the working area of the compensator chamber 96 is equal to the cross sectional area of the tubular piston rod wall 110, the head end working area of the piston 28 is effectively decreased by an amount corresponding to the cross sectional area of the piston rod wall.

When the steering control valve 56 is actuated to port high pressure fluid to the rod end variable volume chamber 34, the compensator valve 58 directs the high pressure fluid to the compensator chamber 96. Since the compensator chamber working area is on the rod end of the piston 28, the total working area on the rod end of the piston is equal to the working area exposed to the fluid pressure in the variable volume chamber 34 plus the working area exposed to the fluid pressure in the compensator chamber 96.

During turns in which high pressure fluid is directed to the head end variable volume chamber 32 of the power steering motor 22, the working area at the head end of the piston 28 is effectively reduced by the working area in the compensator chamber 96. During turns in which high pressure fluid is directed to the rod end variable volume chamber 34 to the power steering motor 22, the rod end working area of the piston is effectively increased by the working area in the compensator chamber 96. Because the working area in the compensator chamber 96 is equal to the annular cross sectional area of the piston rod 110, the effective rod and head end working areas of the piston 28 are equal or balanced during turns in oposite directions.

OPERATION OF THE STEERING AND COMPENSATOR VALVES

Upon rotation of the steering wheel 18 and actuation of the steering control valve 56 to turn the steerable vehicle wheels 10 and 12 toward the right, high pressure fluid is directed from the steering control valve 56 to a passage 114 (FIG. 2) formed in a cylindrical wall 116 of the wall assembly 24. The fluid pressure is conducted to an outlet 118 that opens into the right (as viewed in FIG. 2) end of the variable volume chamber 34. The pressure is applied to an annular area 122 (see FIG. 3) on the rod end of the piston 28 outside of the piston rod 38.

The high pressure fluid in the variable volume chamber 34 is conducted through a passage 124 (FIG. 3) formed in the piston 28 to the compensator or secondary valve 58. The compensator valve 58 is mounted in the piston 28 and includes a spherical ball valve member 128. The ball valve member 128 is pressed against a valve seat 130 in the piston 28 by the fluid pressure conducted through the passage 124. The valve member 128 thereby blocks fluid flow through a second passage 134 formed in the piston 28 and connected with the variable volume chamber 32.

The high pressure fluid from the rod end variable volume chamber 34 flows through the passage 124 and actuated compensator valve 58 to a passage 138. The passage 138 extends radially inwardly of the piston 28 from the compensator valve 58 to the compensator chamber 96 disposed within the hollow piston rod 38. The fluid pressure is applied to the piston 28 and seal 98 to urge the piston toward the left (as viewed in FIG. 3).

The compensator chamber working area is equal to the annular area between a cylindrical inner side surface 142 of the tubular piston rod wall 110 and a maximum or major diameter surface portion 144 of the screw member 82. This working area is equal in magnitude to the cross sectional area of the tubular wall 110 of the piston rod 38.

When the steering control valve 56 (FIG. 2) is actuated to port high pressure fluid to the rod end variable volume chamber 34, the working area at the rod end portion of the piston 28 is exposed to high pressure fluid urging the piston toward the left. The working area is equal to the sum of (a) the annular area 122 disposed on the piston 28 outside of the piston rod 38 and (b) the annular working area disposed in the compensator chamber 96 between the piston rod surface 142 and screw surface 144. At this time, the head end variable volume chamber 32 is connected with drain or reservoir through a passage 148 (FIG. 2) and the steering control valve 56.

Upon rotation of the steering wheel 18 to turn the steerable vehicle wheels toward the left, the steering control valve 56 is actuated to port high pressure fluid to the head end variable volume chamber 32 through the passage 148 (see FIG. 2). The steering control valve 56 also connects the rod end variable volume chamber 34 to reservoir or drain.

High pressure fluid in the head end variable volume chamber 32 is conducted through the passage 134 (FIG. 4) to the compensator valve 58. The fluid presses the ball valve 128 rightwardly (as viewed in FIG. 4) against a valve seat 152 to block fluid flow between the variable volume chambers 32 and 34 through the coaxial piston passages 134 and 124. However, the head end variable volume chamber 32 is connected with the compensator chamber 96 through the passage 134, compensator valve 58 and passage 138. As a result, a high fluid pressure against the compensator chamber working area on the rod end of the piston 28.

Figure 4:
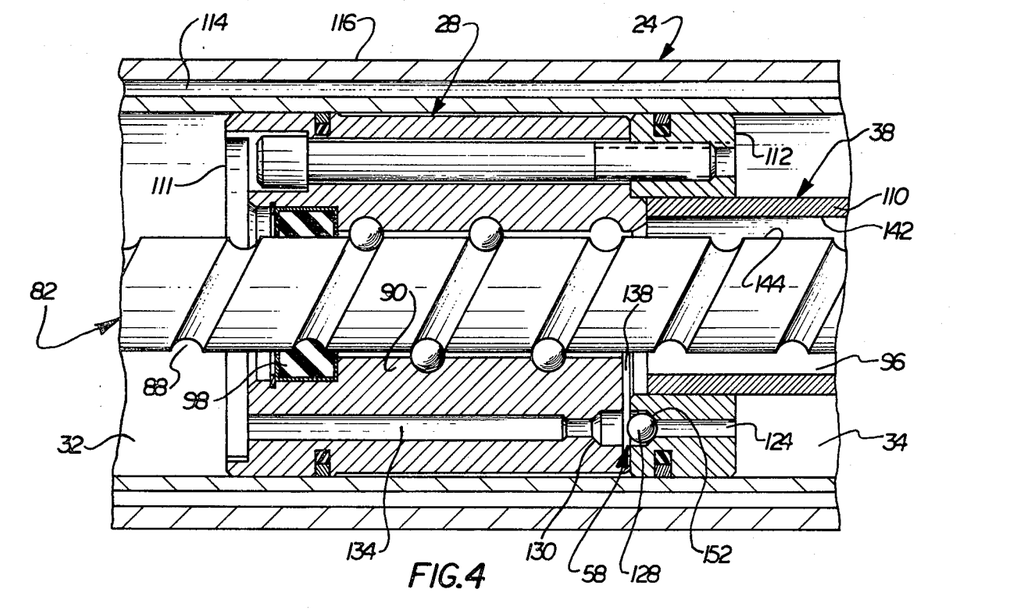
FIG. 4 is an enlarged fragmentary sectional view, generally similar to FIG. 3, illustrating the compensator valve in an actuated condition while the head end of the power steering motor is being supplied with high pressure fluid.

The fluid pressure on the compensator chamber working area opposes movement of the piston 28 toward the right (as viewed in FIG. 4). Nonetheless, fluid pressure against the relatively large working area on the head end portion of the piston 28 is effective to move the piston toward the right (as viewed in FIG. 4) against the influence of the fluid pressure in the compensator chamber 96. As the piston 28 moves toward the right, the volume of the compensator chamber 96 is decreased and fluid flows from the compensator chamber 96 through the compensator valve 58 to the head end variable volume chamber 32.

Since the working area on the rod end of the piston 28 exposed to the fluid pressure in the compensator chamber 96 is equal to the cross sectional area of the tubular wall 110 of the piston rod 38, the fluid pressure force urging the piston 28 toward the left (as viewed in FIG. 3) during a right turn is equal to the fluid pressure force urging the piston toward the right (as viewed in FIG. 4) during a left turn if the vehicle operating conditions are the same. By equalizing the working areas during right and left turns, there tends to be equalization of steering forces during turns in opposite directions to provide a symmetrical level of steering effort in each direction of turn.

Figure 3:
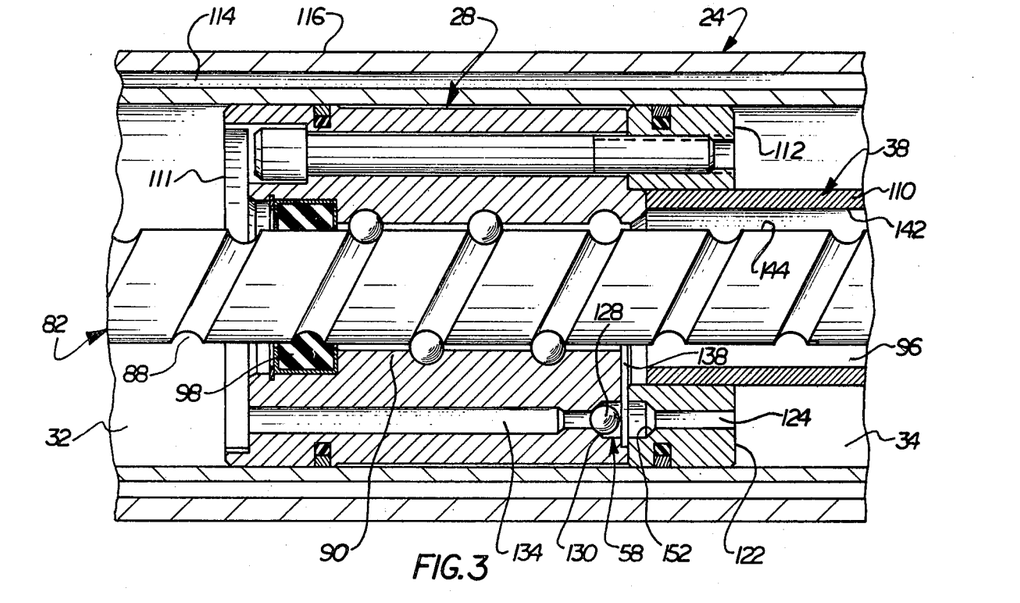
FIG. 3 is an enlarged fragmentary sectional view of a portion of the apparatus shown in FIG. 2 and illustrating a compensator valve in an actuated condition while the rod end of a power steering motor is being supplied with high pressure fluid.

In the embodiment of the invention shown in FIGS. 3 and 4, the compensator valve 58 is of the ball check valve type and is located on the piston 28. The compensator valve 58 could have many different constructions, however, and could be disposed at a location other than on the piston. For example, the compensator valve 58 could be separate from the piston 28 and connected with the head and rod end variable volume chambers 32 and 34 through the passages 148 and 114. If this was done, the compensator valve 58 could be connected with the compensator chamber 96 through a passage extending axially along the screw member 82 to an opening disposed immediately to the left (as viewed in FIG. 2) of the sealing wall 100. In addition, a feedback arrangement of a type other than the illustrated bevel gear and recirculating ball nut type could be used if desired.

COMBINED END OF STROKE AND COMPENSATOR VALVE

Figure 5:
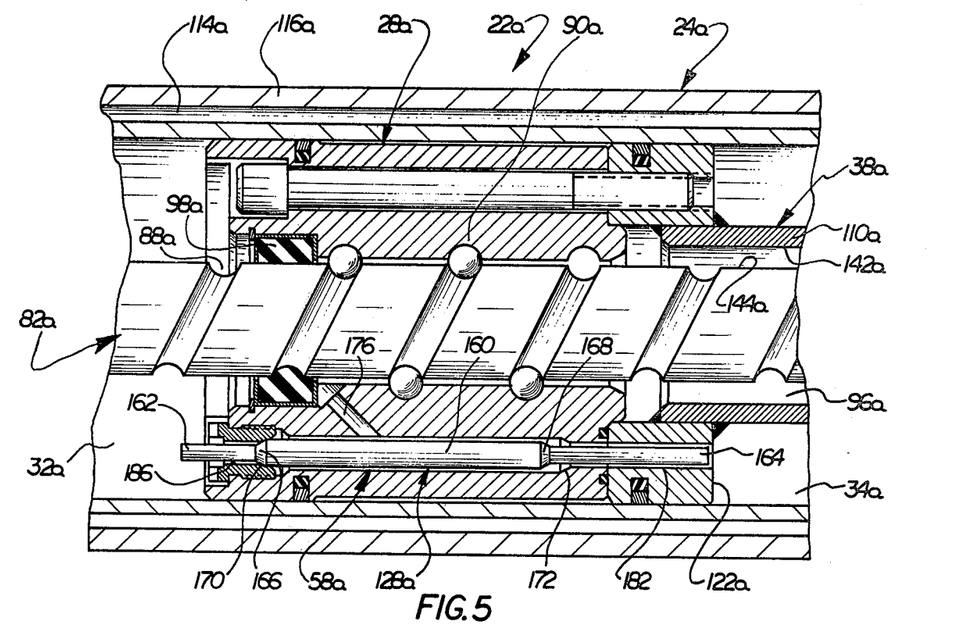
FIG. 5 is an enlarged fragmentary illustration, generally similar to FIGS. 3 and 4, of a second embodiment of the invention in which the compensator valve is actuated to an end of stroke position, the compensator valve being shown in an actuated condition while the rod end of the power steering motor is being supplied with high pressure fluid.
Figure 6:
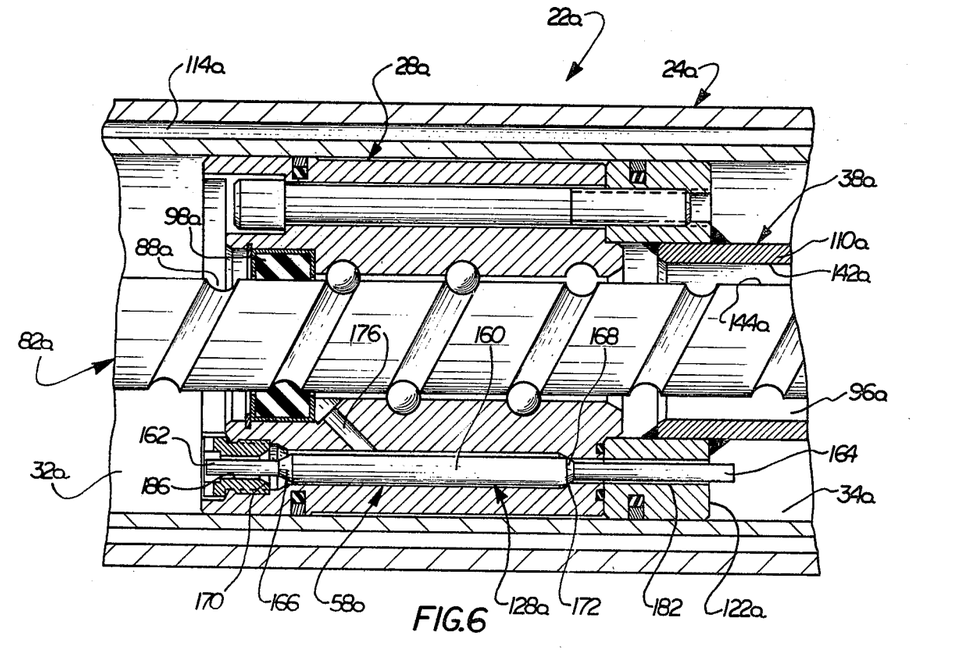
FIG. 6 is an enlarged fragmentary sectional view, generally similar to FIG. 5, illustrating the compensator valve in an actuated condition while the head end of the power steering motor is being supplied with high pressure fluid.

The compensator valve could be constructed so as to combine the functions of the compensator valve 58 of the embodiment of the invention shown in FIGS. 2-4 with a valve which is effective to interrupt movement of the piston 28 as it approaches an end of stroke position. Such a valve could be constructed in a manner similar to the embodiment of the invention shown in FIGS. 5 and 6. Since the embodiment of the invention shown in FIGS. 5 and 6 is generally similar to the embodiment of the invention shown in FIGS. 2-4, similar numerals will be utilized to designate similar components, the suffix letter "a" being associated with the numerals designating components of FIGS. 5 and 6 in order to avoid confusion.

The compensator valve 58a is disposed in the piston 28a. The compensator valve member 128a has a cylindrical body portion 160 and a pair of smaller diameter cylindrical end portions 162 and 164. Between the end portions 162 and 164 and the body portion 160 are frustoconical valving surfaces 166 and 168. The valving surfaces 166 and 168 cooperate with valve seats 170 and 172 to block fluid flow between the variable volume chambers 32a and 34a in much the same manner as in which the ball valve member 128 of the embodiments shown in FIGS. 3 and 4 cooperates with the valve seats 130 and 152 to block fluid flow between the variable volume chambers 32 and 34. The compensator valve 58a is connected with the compensator chamber 96a through a passage 176 in the piston 28a.

In accordance with a feature of this embodiment of the invention, the end portions 162 and 164 of the compensator valve 58a engage the wall assembly 24 as the piston 28a approaches an end of stroke position. This actuates the valve assembly 58a to connect the variable volume chambers 32a and 34a in fluid communication with each other. Connecting the variable volume chambers 32a and 34a in fluid communication interrupts operation of the power steering motor 22a.

When the steering control valve 56 of FIG. 2 is actuated to effect turning movement of the steerable vehicle wheels 10 and 12 to the right, high pressure fluid is conducted through the passage 114a (FIG. 5) to the rod end variable volume chamber 34a. The fluid flows through piston passages 182 and 176 to the compensator chamber 96a. Fluid flow from the variable volume chamber 34a to the variable volume chamber 32a is prevented, however, by engagement of the valve surface 166 with the valve seat 170.

When the piston 28a has been moved toward the left (as viewed in FIG. 5) through almost a complete operating stroke, the leading end 162 of the compensator valve 58a engages the left end (as viewed in FIG. 2) of the cylinder wall assembly 24a. Continued leftward movement of the piston 28a results in the valve surface 166 being moved off the valve seat 170 (FIG. 5). This connects the variable volume chambers 32a and 34a in fluid communication with each other through the compensator valve 58a. The piston 28a then stops moving relative to the cylinder wall assembly 24a.

When the steering control valve 56 is actuated to port high pressure fluid to the head end variable volume chamber 32a, high pressure fluid flows through a passage 186 (see FIG. 6) to the passage 176 leading to the compensator chamber 96a. Fluid flow between the variable volume chambers 32a and 34a is blocked by engagement of the surface 168 on the compensator valve member 128a with the surface 172 on the piston 28a. When the piston 28a has moved toward the right (as viewed in FIG. 6) to almost the end of its working stroke, the end portion 164 of the compensator valve 128a engages the end section 40 (see FIG. 2) of the wall assembly 24a to actuate the compensator valve 128a to an open position connecting the variable volume chamber 34a in fluid communication with the variable volume chamber 32a to thereby interrupt rightward (as viewed in FIG. 6) movement of the piston 28a.

PISTON ROD RETAINER

The piston rod 38 is cylindrical in configuration and extends through a cylindrical opening in the end section 40 (FIG. 2) of the wall assembly 24. During movement of the piston 28 in the main chamber 26, the interaction between the recirculating ball nut 90 and the screw member 82 tends to rotate the piston and the piston rod 38 about their coincident central axes.

Figure 7:
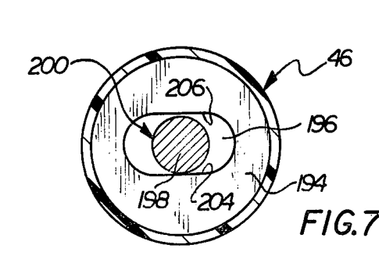
FIG. 7 is a fragmentary view, taken along the line 7—7 of FIG. 2, of a portion of a ball and socket assembly used to connect the steering apparatus with a steering linkage.

To hold the piston 28 and piston rod 32 against rotation, the ball and socket joint 46 is provided with a socket housing 194 (FIG. 7) having an elongated slot 196 through which the shank 198 of a ball stud 200 extends. The ball of the ball stud 200 is enclosed within the socket housing 194. The shank 198 of the ball stud 200 has a diameter which is only slightly less than the width of the slot 196. Therefore, the longitudinally extending sides 204 and 206 of the slot 196 engage opposite sides of the shank 198 of the ball stud to restrict the shank against up and down movement (as viewed in FIG. 7). However, the longitudinally extending slot 196 allows the shank 198 to move freely toward either the left or the right from the central position shown in FIG. 7.

The socket housing 194 is connected with the outer end portion 42 (FIG. 2) of the piston rod 38. The longitudinal central axis of the slot 196 is parallel with the central axis of the piston rod 38. The sides 204 and 206 of the slot 196 also extend parallel to the central axis of the piston rod 38. Thus, the shank 198 of the ball stud 200 is free to pivot so that it moves along a path extending parallel to the longitudinal central axis of the piston rod 38 and is held against pivotal movement in a direction transverse to the longitudinal central axis of the piston rod. Therefore, the piston rod 38 is held against rotation during axial movement of the piston 28 in the main chamber 26 by the ball and socket joint 46.

SUMMARY

The present invention provides a new and improved steering apparatus 14 which effectively equalizes the rod and head end working areas of a power steering motor piston 28 even though a piston rod 38 extends from only one side of the piston. In order to compensate for the cross sectional area of a hollow piston rod 38, a compensator chamber 96 is formed inside the piston rod. The compensator chamber 96 has a working area on the rod end of the piston 28, which is equal to the cross sectional area of the tubular wall 110 of the piston rod 38. A compensator valve assembly 58 directs fluid pressure to the chamber 96 whenever a steering control valve 56 is actuated.

When the steering control valve 56 is actuated to port fluid to apply pressure against the head end of the piston 28, the fluid pressure applied against the compensator chamber working area on the rod end of the piston 28 offsets the fluid pressure applied against a portion of the working area on the head end of the piston and effectively decreases the head end working area. Similarly, when the steering control valve 56 is actuated to port fluid to apply pressure against the rod end of the piston 28, the fluid pressure applied against the compensator chamber working area on the rod end of the piston 28 acts in the same direction as the pressure applied against the working area of the rod end of the piston and effectively increases the rod end working area. The effective working area on the head end of the piston 28 during a turn in one direction is thus equal to the working area on the rod end of the piston during a turn in the opposite direction. This tends to cause the application of equal fluid pressure forces to the piston 28 during turns in opposite directions when the steering apparatus is subjected to the same operating conditions.

Having described specific preferred embodiments of the invention, the following is claimed:

1. An apparatus for use in turning steerable vehicle wheels, said apparatus comprising
    wall means for defining a chamber,
    a piston disposed in said chamber and having first and second end portions, said first end portion of said piston having a first working area,
    a hollow piston rod connected to said second end portion of said piston, said second end portion of said piston having a second working area disposed outside of said piston rod and a third working area at least partially enclosed by said piston rod, the difference in area between said first and third working areas being equal to the sum of said second and third working areas, and
    valve means operable to a first condition to direct fluid pressure against said first and third working areas to effect turning movement of the steerable vehicle wheels in a first direction, said valve means being operable to a second direction to direct fluid pressure against said second and third working areas to effect turning movement of the steerable vehicle wheels in a second direction.

2. An apparatus as set forth in claim 1 further comprising ball and socket means for connecting said piston rod with the steerable vehicle wheels, said ball and socket means including (a) a socket housing having surface means defining an elongated opening and (b) a ball stud having a ball portion disposed in said socket housing and a shank portion extending through said elongated opening, said socket housing cooperating with said shank portion of said ball stud to limit relative movement between said ball stud and said socket housing in a direction transverse to the longitudial axis of said elongated opening.

3. An apparatus as set forth in claim 1 further comprising surface means disposed within said piston rod and cooperating with an inner side surface of said piston rod and said third working area to at least partially define a secondary chamber, said piston and piston rod being axially movable relative to said surface means to vary the volume of said secondary chamber upon operation of said valve means to either of said actuated conditions.

4. An apparatus as set forth in claim 1 wherein said piston rod includes a tubular wall portion, said tubular wall portion of said piston rod having a cross sectional area in a plane extending perpendicular to a central axis of said piston rod equal to said third working area.

5. An apparatus as set forth in claim 1 wherein said valve means includes a steering control valve assembly which directs fluid pressure against said first working area of said piston upon operation of said valve means to the first condition and directs fluid pressure against said second working area of said piston upon operation of said valve means to said second condition and a secondary control valve assembly which is actuated under the influence of fluid pressure conducted from said steering control valve assembly to direct fluid pressure against said third working area upon actuation of said valve means to either said first actuated condition or said second actuated condition.

6. A steering apparatus for use in turning steerable vehicle wheels, said apparatus comprising
    wall means for defining a main chamber,
    a piston disposed within said main chamber and dividing said main chamber into first and second variable volume chambers,
    a hollow piston rod connected with said piston and extending through said wall means, said piston rod being adapted to be connected with the steerable vehicle wheels,
    a rotatable screw member extending through said piston into said piston rod with a space between a longitudinally extending side of said screw member and an inner surface of said piston rod,
    means extending between said screw member and the inner surface of said piston rod to form one end of a pressure chamber disposed within said piston rod and extending axially along said screw member from the one end of the pressure chamber toward said piston,
    means connecting said screw member with said piston for rotating said screw member to an extent which varies as a function of the extent of relative axial movement between said piston and said wall means,
    first valve means operable to a first actuated condition to direct fluid pressure to said first variable volume chamber to effect relative movement between said wall means and said piston in a first direction to turn the steerable vehicle wheel in one direction and operable to a second actuated condition to direct fluid pressure to said second variable volume chamber to effect relative movement between said wall means and said piston in a second direction to turn the steerable vehicle wheel in a direction opposite to the one direction, said screw member being rotatable to actuate said first valve means to an extent which varies as a function of the extent of relative movement between said piston and said wall means, and second valve means for directing fluid pressure from said first variable volume chamber to said pressure chamber upon operation of said first valve means to the first actuated condition and for directing fluid pressure from said second variable volume chamber to said pressure chamber upon operation of said first valve means to the second actuated condition.

7. An apparatus as set forth in claim 6 wherein said hollow piston rod has an annular cross sectional area in a plane extending perpendicular to the central axis of said piston rod, said space between the longitudinally extending side of said screw member and the inner surface of said piston rod having an area in the plane extending perpendicular to the central axis of said piston rod equal to the cross sectional area of said piston rod.

8. An apparatus as set forth in claim 6 wherein said second valve means is disposed in said piston.

9. An apparatus as set forth in claim 6 wherein said screw member extends through said first variable volume chamber and said piston rod extends through said second variable volume chamber, said screw member having a cross sectional area in a plane extending perpendicular to its central axis which is less than the area circumscribed by an outer side surface of said piston rod in a plane extending perpendicular to its central axis.

10. An apparatus as set forth in claim 6 wherein said first valve means includes a movable input member, a first valve element connected with said input member for movement therewith and a second valve element connected with said screw member and cooperating with said first valve element to control fluid flow to said first and second variable volume chambers, said screw member being rotatable to move said second valve element relative to said first valve element upon relative movement between said piston and said wall means.

11. An apparatus as set forth in claim 6 wherein said second valve means is operable in response to movement of said piston to a position adjacent one end of said main chamber to connect said first and second variable volume chambers in fluid communication with each other.

12. An apparatus as set forth in claim 6 wherein said second valve means is operable under the influence of fluid pressure in said first variable volume chamber to an actuated condition in which said second valve means directs fluid pressure from said first variable volume chamber to said pressure chamber, said second valve means being operable under the influence of fluid pressure in said second variable volume chamber to an actuated condition in which said second valve means directs fluid pressure from said second variable volume chamber to said pressure chamber.

13. An apparatus as set forth in claim 12 wherein said wall means includes first and second end sections at opposite ends of said main chamber, said second valve means being connected with said piston for movement therewith relative to said wall means, said second valve means being operable to an actuated condition connecting said first and second variable volume chambers in fluid communication upon movement of said piston to an end of stroke position adjacent to either end of said main chamber.

14. An apparatus as set forth in claim 6 further including ball and socket means for connecting said piston rod with the steerable vehicle wheels, said ball and socket means including a socket housing defining an elongated opening having a longitudinal axis extending parallel to the central axis of said piston rod and a ball stud having a ball portion disposed in said socket housing and a shank portion extending through said elongated opening, said socket housing cooperating with said shank portion to limit movement of said shank portion in a direction transverse to the central axis of said piston rod to thereby limit rotation of said piston and piston rod relative to said wall means about the central axis of said piston rod.

15. An apparatus as set forth in claim 6 wherein said screw member has an external thread convolution extending along said screw member, said apparatus further including a seal member extending between said piston and said external thread convolution on said screw member to form a second end of said pressure chamber.

16. An apparatus for use in turning steerable vehicle wheels, said apparatus comprising
wall means for defining a main chamber,
a piston disposed within said main chamber and dividing said main chamber into first and second variable volume chambers,
means for defining a secondary chamber which is at least partially disposed within said second variable volume chamber, and
control valve means connected in fluid communication with said first and second variable volume chambers and said secondary chamber, said control valve means being operable to a first condition directing high pressure fluid to said first variable volume chamber and to said secondary chamber and permitting fluid to flow out of said second variable volume chamber to effect movement of said piston to turn the steerable vehicle wheels in a first direction, said control valve means being operable to a second condition directing high pressure fluid to said second variable volume chamber and said secondary chamber and permitting fluid to flow out of said first variable volume chamber to effect movement of said piston to turn the steerable vehicle wheels in a second direction.

17. An apparatus as set forth in claim 16 wherein said means for defining a secondary chamber includes a hollow piston rod connected to said piston and extending through said wall means, said secondary chamber being disposed within said piston rod.

18. An apparatus as set forth in claim 17 further including ball and socket joint means for connecting said piston rod with the steerable vehicle wheels, said ball and socket joint means including a socket housing having an elongated slot with a longitudinal axis extending parallel to the central axis of said piston rod and a ball stud having a ball portion disposed within said socket housing and a shank portion extending through said slot, said socket housing cooperating with said shank portion to limit sidewise movement of said shank portion in a direction transverse to the central axis of said piston rod while permitting substantial movement of said shank portion in a direction parallel to the central axis of said piston rod.

19. An apparatus as set forth in claim 16 wherein said control valve means includes steering control valve means connected in fluid communication with said first and second variable volume chambers, said steering control valve means including a first valve element, a movable input member, and a second valve element connected with said input member for movement therewith relative to said first valve element, said control valve means further including second valve means connected in fluid communication with said steering control valve means and operable to direct fluid pressure to said secondary chamber upon actuation of said control valve means to said first condition, said second valve means being effective to direct fluid pressure to said secondary chamber upon actuation of said control valve means to said second condition.

20. An apparatus as set forth in claim 19 wherein said second valve means is connected with said piston for movement therewith relative to said wall means.

21. An apparatus as set forth in claim 20 wherein said piston includes first passage means for conducting fluid flow from said secondary chamber to said first variable volume chamber upon actuation of said control valve means to said first condition, said second valve means being effective to block fluid flow through said first passage means upon actuation of said control valve means to said second condition.

22. An apparatus as set forth in claim 21 wherein said piston further includes second passage means for conducting fluid flow from said second variable volume chamber to said secondary chamber upon actuation of said control valve means to said second condition, said second valve means being effective to block fluid flow through said second passage means upon actuation of said control valve means to said first condition.

23. An apparatus as set forth in claim 16 further including a rotatable screw member connected with said control valve means and said piston, said means for defining a secondary chamber including a hollow piston rod connected with said piston and disposed in telescopic relationship with said screw member, first seal means extending between said screw member and said piston, and second seal means extending between said screw member and said piston rod, said piston rod having a cross sectional area equal to the cross sectional area of a space between said piston rod and said screw member in a plane extending perpendicular to a central axis of said piston rod.

24. An apparatus as set forth in claim 16 wherein said piston and wall means are movable relative to each other between first and second end of stroke positions, said control valve means including first valve means for directing fluid pressure to said secondary chamber upon actuation of said control valve means to said first and second conditions and means for actuating said first valve means to connect said first variable volume chamber in fluid communication with said second variable volume chamber upon relative movement between said piston and said wall means to either of said end of stroke positions.

* * * * *

UNITED STATES PATENT AND TRADEMARK OFFICE
CERTIFICATE OF CORRECTION

PATENT NO. : 4,418,781
DATED : December 6, 1983
INVENTOR(S) : William T. Rabe et al It is certified that error appears in the above—identified patent and that said Letters Patent are hereby corrected as shown below:

Column 9, line 60, change "direction" to - - condition - -.

Column 10, line 6, change "longitudial" to - - longitudinal - -.

Signed and Sealed this

Fourteenth Day of February 1984

[SEAL]

Attest:

GERALD J. MOSSINGHOFF

Attesting Officer

Commissioner of Patents and Trademarks